United States Patent
Wang

(10) Patent No.: US 9,715,138 B2
(45) Date of Patent: Jul. 25, 2017

(54) DISPLAY PANEL, METHOD FOR ADHERING FILMS AND METHOD FOR PRODUCING A DISPLAY PANEL

(71) Applicants: BOE Technology Group Co., Ltd., Beijing (CN); BOE Optical Science and Technology Co., Ltd., Suzhou (CN)

(72) Inventor: Tao Wang, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 54 days.

(21) Appl. No.: 14/444,166

(22) Filed: Jul. 28, 2014

(65) Prior Publication Data

US 2015/0301371 A1   Oct. 22, 2015

(30) Foreign Application Priority Data

Apr. 18, 2014 (CN) .......................... 2014 1 0158676

(51) Int. Cl.
*G02F 1/1335* (2006.01)
*G02F 1/1333* (2006.01)

(52) U.S. Cl.
CPC ............ *G02F 1/133528* (2013.01); *G02F 2001/133311* (2013.01); *G02F 2202/28* (2013.01)

(58) Field of Classification Search
CPC .............. G02F 1/133528; G02F 1/133536
See application file for complete search history.

(56) References Cited

U.S. PATENT DOCUMENTS

| 4,963,001 A * | 10/1990 | Miyajima ......... G02F 1/133385 349/5 |
| 6,104,457 A * | 8/2000 | Izumi .................. G02F 1/13336 349/153 |
| RE37,377 E * | 9/2001 | Gunjima .................... F21V 9/14 349/113 |
| 2010/0253873 A1* | 10/2010 | Kretz ................ G02F 1/133308 349/58 |

FOREIGN PATENT DOCUMENTS

| CN | 101930130 | 12/2010 |
| CN | 102236200 | 11/2011 |
| CN | 102622148 | 8/2012 |
| EP | 0 597 261 | 5/1994 |
| JP | 2003-262858 | 9/2003 |

OTHER PUBLICATIONS

Office Action from Chinese Patent Application No. 201410158676.3, dated Mar. 21, 2016.
Office Action from Chinese Patent Application No. 201410158676.3, dated Jul. 18, 2016.

* cited by examiner

*Primary Examiner* — Phu Vu
(74) *Attorney, Agent, or Firm* — Westman, Champlin & Koehler, P.A.

(57) ABSTRACT

A display panel is disclosed. The display panel comprising: two substrates assembled and connected to each other; films adhered to a display region on one surface of the first one of the two substrates facing away the second one and a display region on one surface of the second one of the two substrates facing away the first one respectively; and seal strips provided along the locations at which the substrates adjoin an edge of the films, for sealing the films and the substrates.

4 Claims, 3 Drawing Sheets

DISPLAY PANEL, METHOD FOR ADHERING FILMS AND METHOD FOR PRODUCING A DISPLAY PANEL

CROSS-REFERENCE TO RELATED APPLICATION

This application claims the benefit of Chinese Patent Application No. 201410158676.3 filed on Apr. 18, 2014 in the State Intellectual Property Office of China, the whole disclosure of which is incorporated herein by reference.

BACKGROUND OF THE INVENTION

Field of the Invention

The present disclosure relates to the technical field of display, more particularly, relates to a display panel, a method for adhering films and a method for producing a display panel.

Description of the Related Art

A display panel in the prior art typically includes an array substrate and a color filter substrate opposed to each other and an upper polarization plate which is adhered to one surface of the color filter substrate facing away the array substrate and a lower polarization plate which is adhered to one surface of the array substrate facing away the color filter substrate.

When adhering the polarization plates (the upper polarization plate and the lower polarization plate), due to poor raw materials of the polarization plates (the upper polarization plate and the lower polarization plate) and the defects of the adhering apparatus in itself, bubbles are easily formed between the polarization plates and the substrates (the array substrate and the color filter substrate). Furthermore, when the panel adhered with the polarization plates (the upper polarization plate and the lower polarization plate) is subjected to the subsequent high temperature and high humidity experiments, the edges of the polarization plates tend to lift up and moisture in atmosphere tends to induced between the polarization plates and the substrates (the array substrate and the color filter substrate) to form bubbles.

SUMMARY OF THE INVENTION

In order to solve the above and other technical problems in the prior art, the present disclosure provides a display panel and a method for producing a display panel.

According to an embodiment of the present invention, it provides an display panel comprising: two substrates assembled and connected to each other; films adhered to a display region on one surface of the first one of the two substrates facing away the second one and a display region on one surface of the second one of the two substrates facing away the first one respectively; and seal strips provided along the locations at which the substrates adjoin an edge of the films, for sealing the films and the substrates.

According to another embodiment of the present invention, it provides a method for adhering films, in a process for producing a display panel, the method comprising: step 1: adhering films to a display region on one surface of the first one of the two substrates facing away the second one and a display region on one surface of the second one of the two substrates facing away the first one respectively, the two substrates being assembled and connected to each other; step 2: coating seal glues along the locations at which the substrates adjoin an edge of the films.

According to a yet embodiment of the present invention, it provides a method for producing a display panel, the method comprising: step 1: adhering films to a display region on one surface of the first one of the two substrates facing away the second one and a display region on one surface of the second one of the two substrates facing away the first one respectively, the two substrates being assembled and connected to each other; step 2: coating seal glues along the locations at which the substrate adjoins an edge of the films; step 3: performing chips on glass on one of the two substrates.

According to another embodiment of the present invention, it provides a method for producing a display panel, the method comprising: step 1: adhering films to a display region on one surface of the first one of the two substrates facing away the second one and a display region on one surface of the second one of the two substrates facing away the first one respectively, the two substrates being assembled and connected to each other; step 2: performing chips on glass on one of the two substrates; step 3: coating seal glues along the locations at which the substrates adjoin an edge of the films.

BRIEF DESCRIPTION OF THE DRAWINGS

The above and other features of the present invention will become more apparent by describing in detail exemplary embodiments thereof with reference to the accompanying drawings, in which.

REFERENCE NUMERALS

Figure 1:
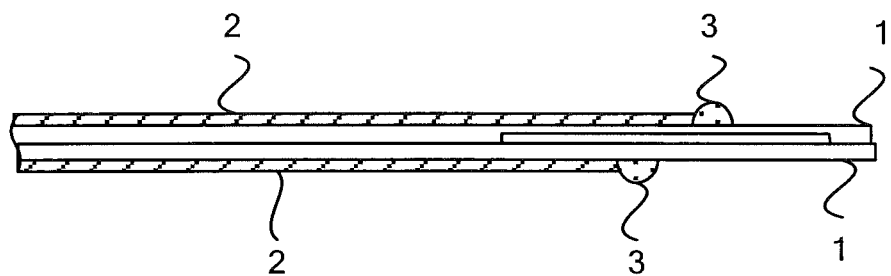
FIG. 1 is a schematic view showing a cross section of a liquid crystal panel according to a first exemplified embodiment of the present invention.

1: substrate; 2: film; 21: polarization plate; 22: phase difference plate; 3: seal ribbon.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In accordance with a general concept of the present invention, it provides a display panel comprising: two substrates assembled and connected to each other; films adhered to a display region on one surface of the first one of the two substrates facing away the second one and a display region on one surface of the second one of the two substrates facing away the first one respectively; and seal strips provided along the locations at which the substrates adjoin an edge of the films, for sealing the films and the substrates.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view showing a cross section of a liquid crystal panel according to a first exemplified embodiment of the present invention. As illustrated in FIG. 1, the display panel according to an embodiment of the present invention comprises two substrates 1 assembled and connected to each other; films 2 adhered to a display region on one surface of the first one of the two substrates 1 facing away the second one and a display region on one surface of the second one of the two substrates 1 facing away the first one respectively; and seal strips 3 provided along the locations at which the substrates 1 adjoin an edge of the films 2, for sealing the films and the substrates. As shown in FIG. 1, the seal strips 3 between the substrate 1 and the edge of the films 2 are used to seal.

In the display panel according to the embodiment of the present invention, by means of seal members, the periphery of the films and the substrates are sealed at their adjoining locations. In this way, it may prevent the edges of the films from lifting up and prevent moisture in atmosphere from being induced between the polarization plates and the substrates to reduce bubbles produced between the films and the substrates.

Thus, the display panel according to the embodiment of the present invention has a good display effect.

As an example, the above seal strips may be in form of single strip, or may be connected by a plurality of seal points by gluing.

As an example, in order to prevent the seal strips from interfering other components on the display panel, the seal strips may have a width of 0.5 mm to 2.5 mm and have a height not more than 1 mm. For example, the width may be 0.5 mm, 0.8 mm, 1.0 mm, 1.2 mm, 1.4 mm, 1.6 mm, 1.8 mm, 2 mm, 2.3 mm, 2.5 mm. The height may be such as 0.2 mm, 0.4 mm, 0.6 mm, 0.8 mm and 1 mm. The further listing of more numerical values will be omitted below.

In an exemplified embodiment, the seal strips are made from shadow less glue. The shadow less glue may also be called as photosensitive glue or UV (Ultraviolet Ray) curing glue. It means the glue that must be cured by being illuminated by UV. UV, which is invisible by naked eyes, is an electromagnetic radiation out of visible light and has a wavelength range of 10~400 nm. The principle of curing shadow less glue is that the light initiator (or photoinitiator) in the UV curing material absorbs UV in the UV illumination and then produces reactive free radicals or positive ions to initiate chemical reactions of monomeric polymerization, crosslinking and grafting. In this way, the adhesives will be converted into solid phase from liquid phase within a few seconds. Of course, the seal strips may be made from other hot melt matters having seal effects.

Figure 2:
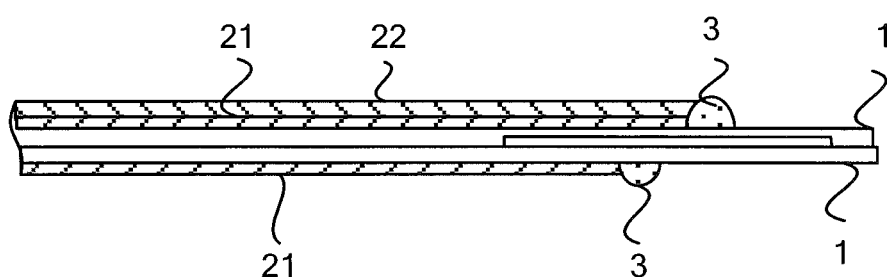
FIG. 2 is a schematic view showing a cross section of a liquid crystal panel according to a second exemplified embodiment of the present invention.

As an example, the films may be polarization plates and/or phase different plates. FIG. 2 is a schematic view showing a cross section of a liquid crystal panel according to a second exemplified embodiment of the present invention. The display panel is 3D panel. The films 2 in the display panel shown in FIG. 2 include polarization plates 21 and phase difference plates 22. After the polarization plates 21 are adhered to the display region of the substrate 1, the phase difference plates 22 are adhered to the polarization plates 21 and seal glues are coated at the adjoining locations of the substrate 1 and edges of the polarization plates 21 and the phase difference plates 22.

In an exemplified embodiment, the two substrates are the array substrate and the color filter substrate respectively. It should be noted that the electrode wiring regions of the display panel are arranged on the array substrate. The regions are larger than the color filter substrate by at least 2 mm. After the gluing machine is aligned with the display panel, the positioning precision may up to 0.1 mm. Thus, the seal glue coated will not contact with the electrode wirings of the array substrate. In addition, as the materials of the seal strips are insulators, they will not affect the array substrate even if they contact with the electrode wirings.

Figure 3:
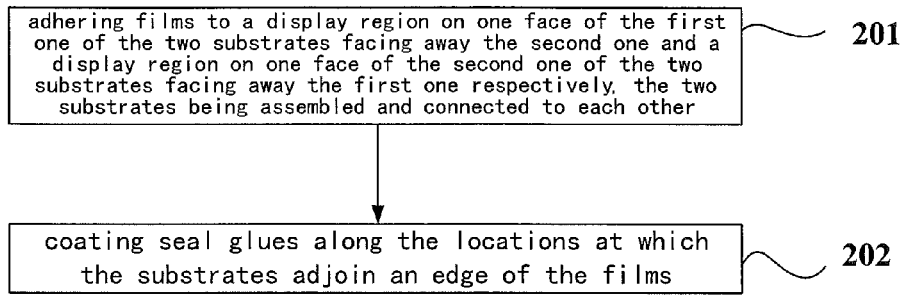
FIG. 3 is a schematic flow chart of a first method for adhering films according to an embodiment of the present invention.

FIG. 3 is a schematic flow chart of a first method for adhering films according to an embodiment of the present invention. As shown in FIG. 3, the embodiment of the present invention provides the first method for adhering films, the method comprising:

step 201: adhering films to a display region on one surface of the first one of the two substrates facing away the second one and a display region on one surface of the second one of the two substrates facing away the first one respectively, the two substrates being assembled and connected to each other;

step 202: coating seal glues along the locations at which the substrates adjoin an edge of the films.

It should be noted that the above method for adhering the films may not only be used in the process for producing the display panel, but also be used in the process for producing other devices which need to adhere films.

The above step 202 may be performed by a Point Gum Machine. At first, the alignment is performed by CCD camera. The alignment mark may be a crossing mark on the panel. The coated seal glues are connected together to form the seal strip.

In order to reduce the negative effect of bubbles of the display panel, the method may further the step between the step 201 and the step 202: pressurizing the films to perform deaeration.

In order to prevent the seal glues from interfering other components on the display panel, in the above step 202, the seal strip may have a width of 0.5 mm to 2.5 mm and have a height not more than 1 mm.

Figure 4:
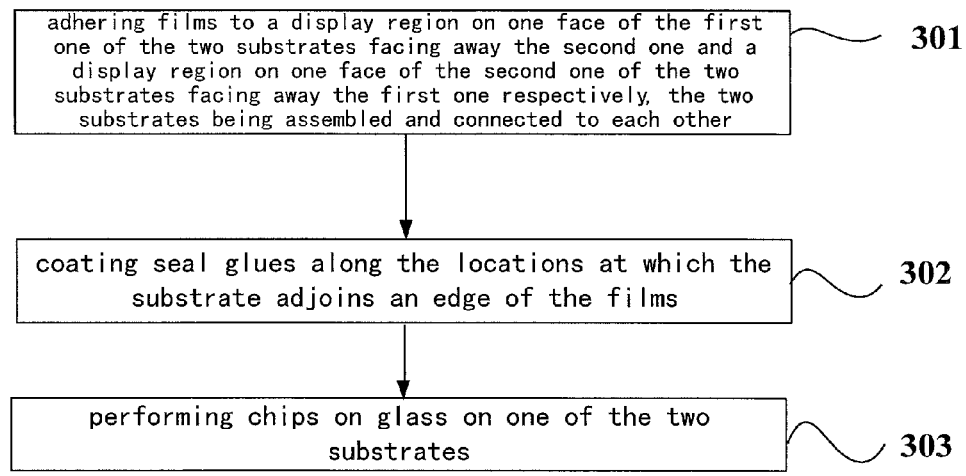
FIG. 4 is a schematic flow chart of a second method for adhering films according to an embodiment of the present invention.

FIG. 4 is a schematic flow chart of a second method for adhering films according to an embodiment of the present invention. The method comprises:

step 301: adhering films to a display region on one surface of the first one of the two substrates facing away the second one and a display region on one surface of the second one of the two substrates facing away the first one respectively, the two substrates being assembled and connected to each other;

step 302: coating seal glues along the locations at which the substrate adjoins an edge of the films;

step 303: performing chips on glass on one of the two substrates.

The above step 302 may be performed by the Point Gum Machine. At first, the alignment is performed by CCD camera. The alignment mark may be a crossing mark on the panel.

In order to reduce the negative effect of bubbles of the display panel, the method may further the step between the step 301 and the step 302: pressurizing the films to perform deaeration.

In order to prevent the seal glues from interfering other components on the display panel, in the above step 302, the seal strips may have a width of 0.5 mm to 2.5 mm and have a height not more than 1 mm.

Figure 5:
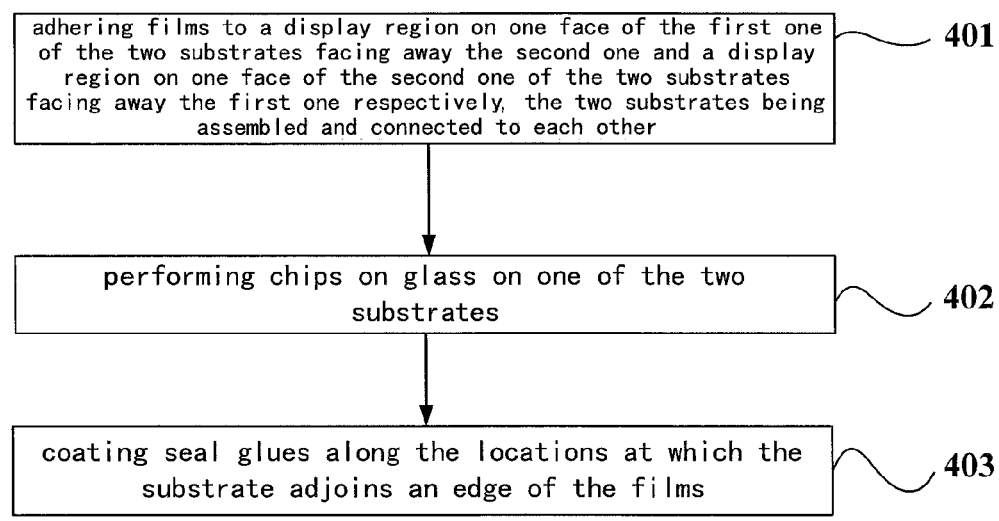
FIG. 5 is a schematic flow chart of a third method for adhering films according to an embodiment of the present invention.

FIG. 5 is a schematic flow chart of a third method for adhering films according to an embodiment of the present invention. The method comprises:

step 401: adhering films to a display region on one surface of the first one of the two substrates facing away the second one and a display region on one surface of the second one of the two substrates facing away the first one respectively, the two substrates being assembled and connected to each other;

step 402: performing chips on glass on one of the two substrates;

step 403: coating seal glues along the locations at which the substrate adjoins an edge of the films.

The above step 403 may be performed by the Point Gum Machine. At first, the alignment is performed by CCD camera. The alignment mark may be a crossing mark on the panel. While the sealing frame glue is coated, blue-gel may also be coated.

In order to reduce the negative effect of bubbles of the display panel, the method may further the step between the step 401 and the step 402: pressurizing the films to perform deaeration.

In order to prevent the seal glues from interfering other components on the display panel, in the above step 403, the seal strips may have a width of 0.5 mm to 2.5 mm and have a height not more than 1 mm.

Although several exemplary embodiments have been shown and described, the present invention is not limited to those and it would be appreciated by those skilled in the art that various changes or modifications may be made in these embodiments without departing from the principles and spirit of the disclosure. These changes or modifications will fall within the scope of the present invention. The scope of the present invention is defined in the claims and their equivalents.

What is claimed is:

1. A display panel comprising:
   two substrates assembled and connected to each other;
   films adhered to a display region on one surface of the first one of the two substrates facing away the second one and a display region on one surface of the second one of the two substrates facing away the first one respectively; and
   seal strips provided along the locations at which the substrates adjoin an edge of the films, for sealing the films and the substrates;
   wherein the seal strips are connected by a plurality of seal points by gluing;
   the films comprise polarization plates and phase difference plates, wherein the polarization plates are adhered to the display region of the first one of the two substrates, the phase difference plates are adhered to the polarization plates, and the seal strips are coated at adjoining locations of the first one of the two substrates and edges of the polarization plates and the phase difference plates;
   the two substrates are an array substrate and a color filter substrate respectively;
   wherein the films are pressurized to perform deaeration;
   wherein the seal strips have a width range of 0.5 millimeter to 2.5 millimeters and have a height not more than 1 millimeter;
   wherein the seal strips are made from shadow less glue, which is cured by being illuminated by UV;
   wherein an light initiator in the shadow less glue absorbs UV in the UV illumination and then produces reactive free radicals or positive ions to initiate chemical reactions of monomeric polymerization, crosslinking and grafting, so that the shadow less glue is converted into solid phase from liquid phase within a few seconds;
   wherein chips are performed on glass on one of the two substrates;
   wherein electrode wiring regions of the display panel are arranged on the array substrate, and the regions are larger than the color filter substrate by at least 2 mm.

2. A method for adhering films, in a process for producing a display panel, the method comprising:
   step 1: adhering films to a display region on one surface of the first one of the two substrates facing away the second one and a display region on one surface of the second one of the two substrates facing away the first one respectively, the two substrates being assembled and connected to each other;
   step 2: coating seal glues along the locations at which the substrates adjoin an edge of the films, and connecting a plurality of seal glue points by gluing to form seal strips;
   wherein the method further comprises a step between the step 1 and the step 2:
   pressurizing the films to perform deaeration;
   the films comprise polarization plates and phase difference plates, wherein the polarization plates are adhered to the display region of the first one of the two substrates, the phase difference plates are adhered to the polarization plates, and the seal strips are coated at adjoining locations of the first one of the two substrates and edges of the polarization plates and the phase difference plates;
   the two substrates are an array substrate and a color filter substrate respectively;
   wherein the seal strips have a width range of 0.5 millimeter to 2.5 millimeters and have a height not more than 1 millimeter;
   wherein the seal strips are made from shadow less glue, which is cured by being illuminated by UV;
   wherein an light initiator in the shadow less glue absorbs UV in the UV illumination and then produces reactive free radicals or positive ions to initiate chemical reactions of monomeric polymerization, crosslinking and grafting, so that the shadow less glue is converted into solid phase from liquid phase within a few seconds;
   wherein electrode wiring regions of the display panel are arranged on the array substrate, and the regions are larger than the color filter substrate by at least 2 mm.

3. A method for producing a display panel, the method comprising:
   step 1: adhering films to a display region on one surface of the first one of the two substrates facing away the second one and a display region on one surface of the second one of the two substrates facing away the first one respectively, the two substrates being assembled and connected to each other;
   step 2: coating seal glues along the locations at which the substrate adjoins an edge of the films, and connecting a plurality of seal glue points by gluing to form seal strips;

step 3: performing chips on glass on one of the two substrates;

wherein the method further comprises a step between the step 1 and the step 2:

pressurizing the films to perform deaeration;

the films comprise polarization plates and phase difference plates, wherein the polarization plates are adhered to the display region of the first one of the two substrates, the phase difference plates are adhered to the polarization plates, and the seal strips are coated at adjoining locations of the first one of the two substrates and edges of the polarization plates and the phase difference plates;

the two substrates are an array substrate and a color filter substrate respectively;

wherein the seal strips have a width range of 0.5 millimeter to 2.5 millimeters and have a height not more than 1 millimeter;

wherein the seal strips are made from shadow less glue, which is cured by being illuminated by UV;

wherein an light initiator in the shadow less glue absorbs UV in the UV illumination and then produces reactive free radicals or positive ions to initiate chemical reactions of monomeric polymerization, crosslinking and grafting, so that the shadow less glue is converted into solid phase from liquid phase within a few seconds;

wherein electrode wiring regions of the display panel are arranged on the array substrate, and the regions are larger than the color filter substrate by at least 2 mm.

4. A method for producing a display panel, the method comprising:

step 1: adhering films to a display region on one surface of the first one of the two substrates facing away the second one and a display region on one surface of the second one of the two substrates facing away the first one respectively, the two substrates being assembled and connected to each other;

step 2: performing chips on glass on one of the two substrates;

step 3: coating seal glues along the locations at which the substrates adjoin an edge of the films, and connecting a plurality of seal glue points by gluing to form seal strips;

wherein the method further comprises a step between the step 1 and the step 2:

pressurizing the films to perform deaeration;

the films comprise polarization plates and phase difference plates, wherein the polarization plates are adhered to the display region of the first one of the two substrates, the phase difference plates are adhered to the polarization plates, and the seal strips are coated at adjoining locations of the first one of the two substrates and edges of the polarization plates and the phase difference plates;

the two substrates are an array substrate and a color filter substrate respectively;

wherein the seal strips have a width range of 0.5 millimeter to 2.5 millimeters and have a height not more than 1 millimeter;

wherein the seal strips are made from shadow less glue, which is cured by being illuminated by UV;

wherein an light initiator in the shadow less glue absorbs UV in the UV illumination and then produces reactive free radicals or positive ions to initiate chemical reactions of monomeric polymerization, crosslinking and grafting, so that the shadow less glue is converted into solid phase from liquid phase within a few seconds;

wherein electrode wiring regions of the display panel are arranged on the array substrate, and the regions are larger than the color filter substrate by at least 2 mm.

* * * * *